United States Patent [19]
Hafey et al.

[11] Patent Number: 5,124,532
[45] Date of Patent: Jun. 23, 1992

[54] ORGANIZER FOR CORDLESS ELECTRICALLY ENERGIZED HAIR SALON UTENSILS

[76] Inventors: Marilyn J. Hafey; Jim Malone, both of 880 Genesse Ave., Sebastian, Fla. 32958

[21] Appl. No.: 550,056

[22] Filed: Jul. 9, 1990

[51] Int. Cl.⁵ .......................... H05B 1/02; A45D 1/04; A45D 20/10; H02J 7/00
[52] U.S. Cl. .................................. 219/242; 132/229; 132/233; 219/219; 219/222; 219/225; 219/240; 320/2
[58] Field of Search .................. 219/222–226, 219/240, 242, 219; 132/229, 233; 320/2

[56] References Cited

U.S. PATENT DOCUMENTS

| | | | |
|---|---|---|---|
| D. 256,637 | 9/1980 | Chiklis | D6/571 |
| 3,391,470 | 7/1968 | Chedister | 320/2 X |
| 3,513,290 | 5/1970 | Burley et al. | 219/240 X |
| 3,569,180 | 4/1972 | Urbush | 320/2 |
| 3,603,765 | 9/1971 | Underwood | 219/222 |
| 4,159,773 | 7/1979 | Losenno et al. | 219/242 X |
| 4,354,092 | 10/1982 | Manabe et al. | 320/2 X |
| 4,647,831 | 3/1987 | O'Malley et al. | 320/2 |
| 4,716,352 | 12/1987 | Hurn et al. | 320/2 |
| 4,739,242 | 4/1988 | McCarty et al. | 320/2 |
| 4,757,183 | 7/1988 | Karey et al. | 34/97 X |

*Primary Examiner*—Anthony Bartis
*Attorney, Agent, or Firm*—Leon Gilden

[57] ABSTRACT

An apparatus including a housing, wherein the housing defines a top wall formed with a series of aligned bores therethrough, each of the bores receiving a rechargeable battery powered hair salon utensil such as, a hair dryer, large diameter hair curling iron, small diameter hair curling iron, electric razor, etc., therewithin. A recharging plug is provided within each bore for providing recharging of each utensil. Optionally, the organization includes replacement battery packs selectively mounted to each utensil to ensure continuous use of each utensil. Further, a mirror structure is mounted rearwardly of a forward wall of the housing and nested therewithin and selectively retracted therefrom, wherein the mirror is heated by proximity to the recharging cells of the organization minimizing fogging of the mirror in use.

5 Claims, 5 Drawing Sheets

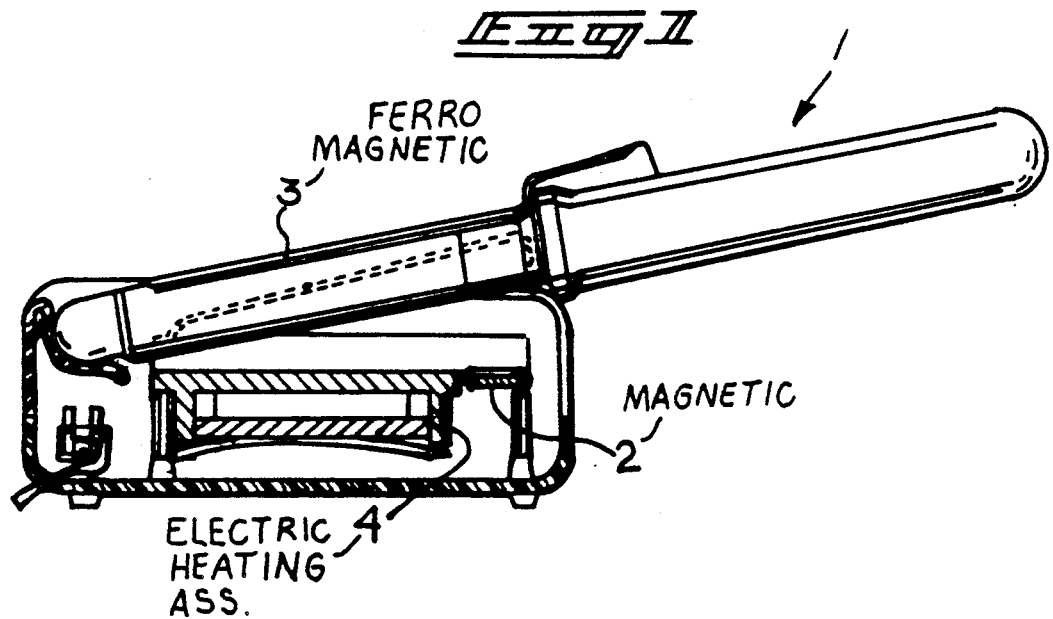
FIG. 1 — PRIOR ART
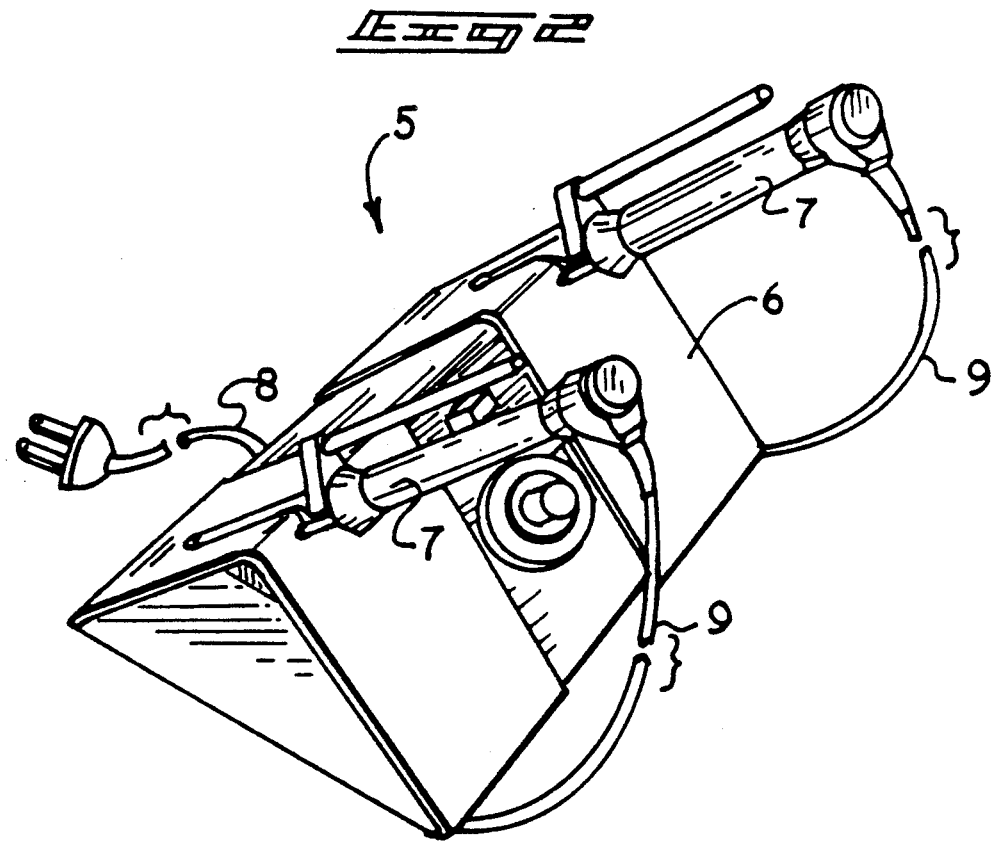
FIG. 2 — PRIOR ART

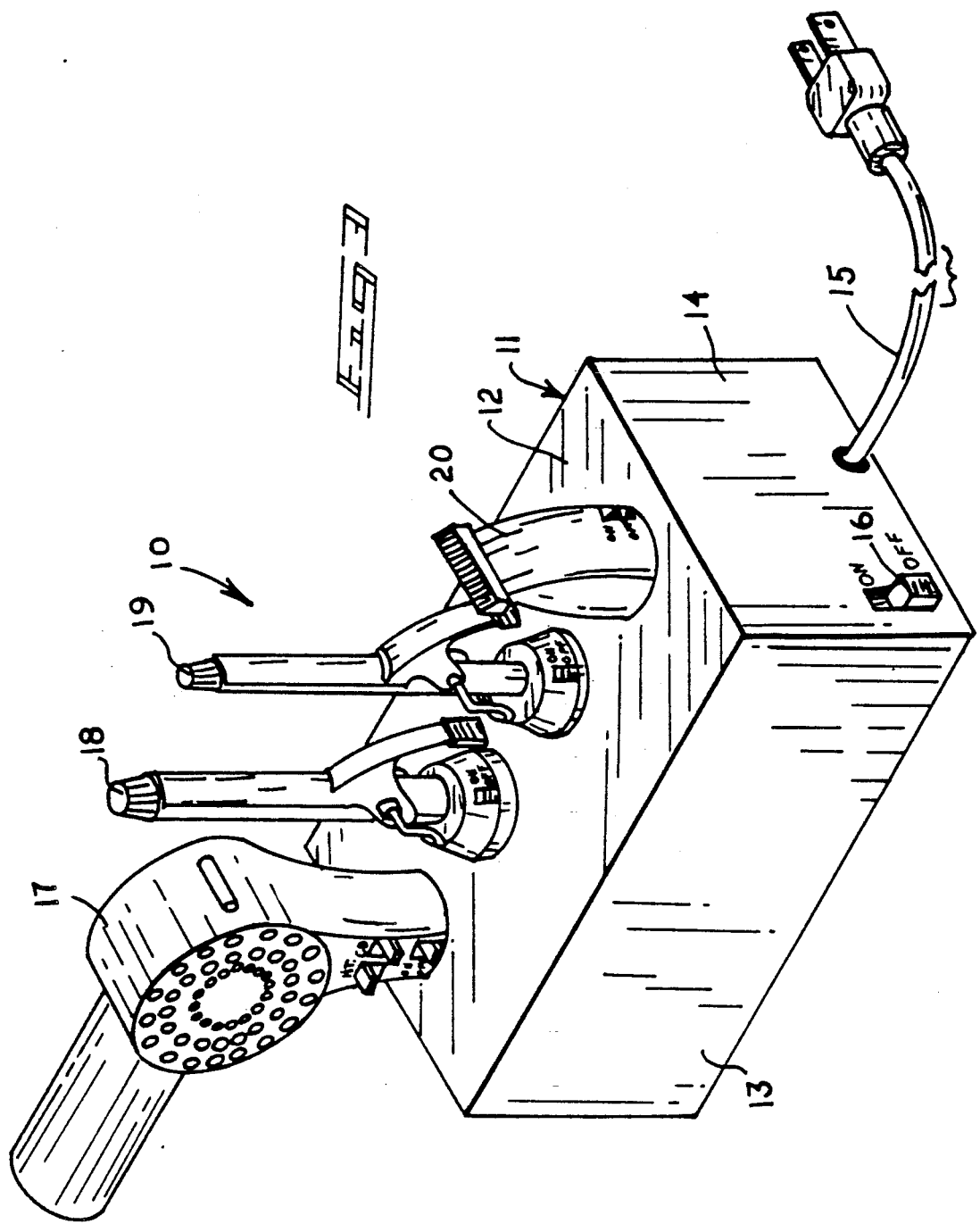

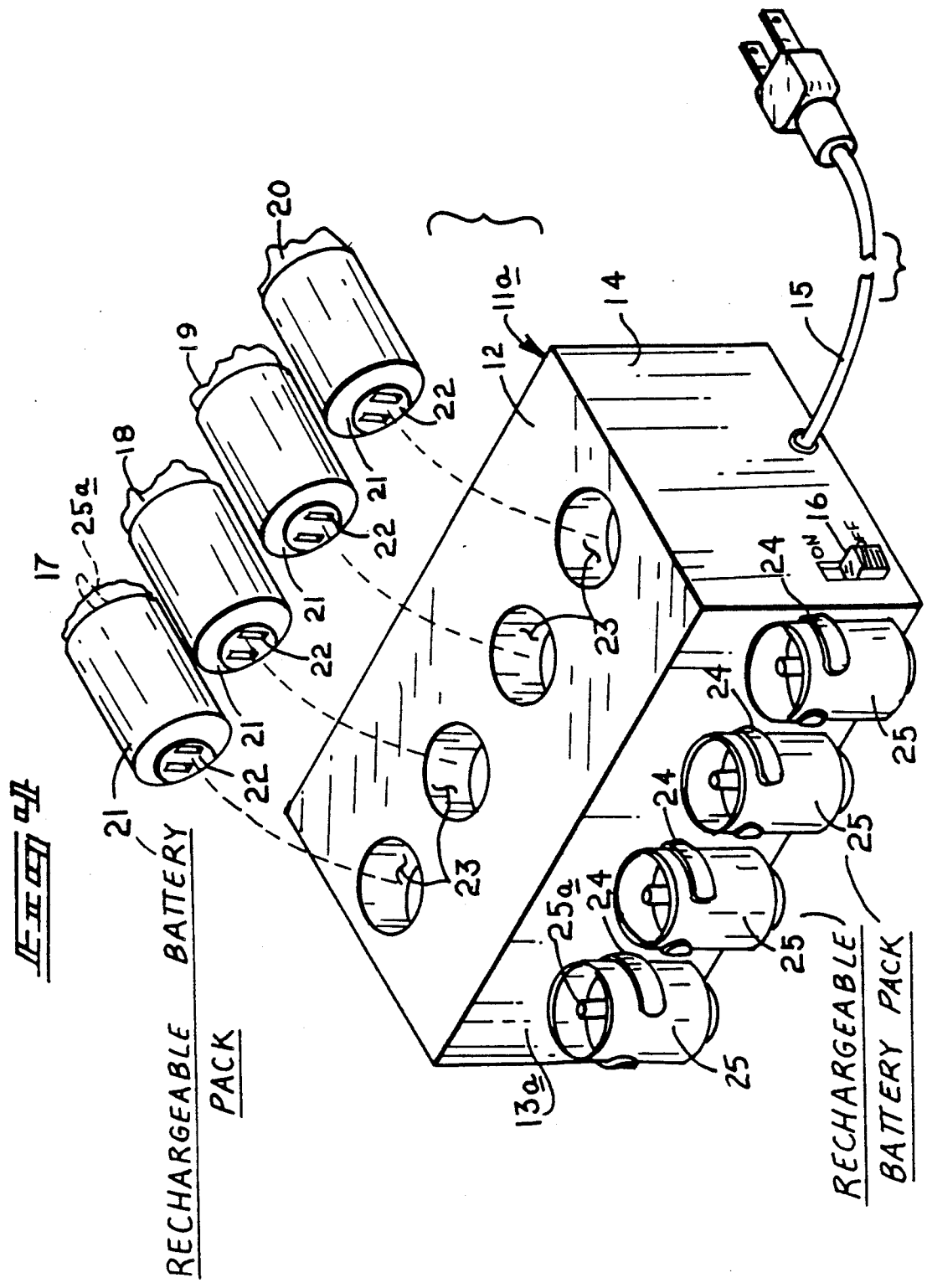

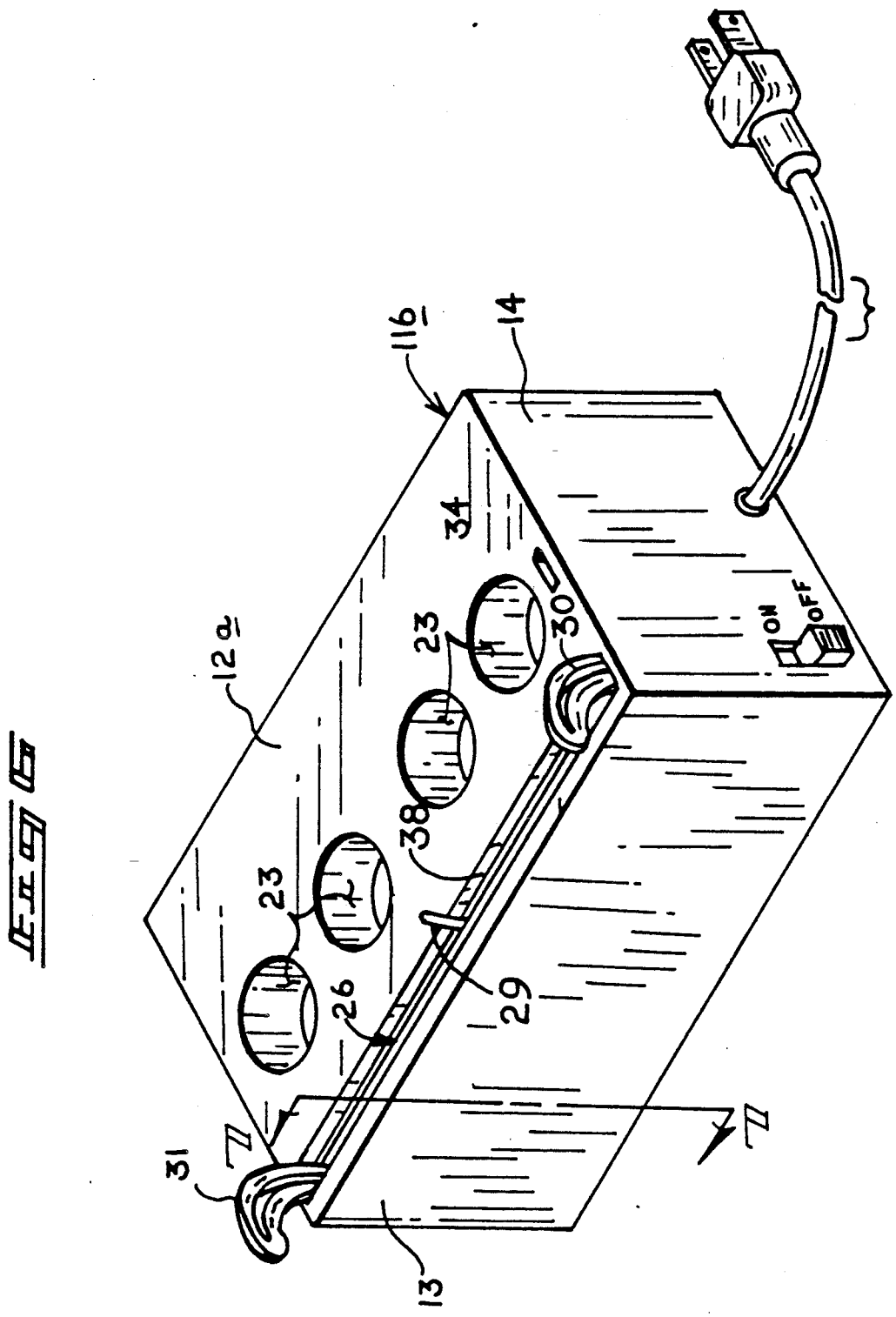

ORGANIZER FOR CORDLESS ELECTRICALLY ENERGIZED HAIR SALON UTENSILS

BACKGROUND OF THE INVENTION

1. Field of the Invention

The field of invention relates to hair salon grooming apparatus, and more particularly pertains to a new and improved cordless salon utensil organizer apparatus wherein the same selectively receives a plurality of slot utensils in an aligned relationship for recharging, convenience, and storage.

2. Description of the Prior Art

Rechargeable appliances have been utilized in the prior art. Heretofore, the use of rechargeable salon type appliances mounted to convenient storage and access has not been set forth by the prior art in a manner to permit their continuous use and convenience of positioning. During a typical grooming scenario, various slot appliances are frequently required, such as a hair dryer, a plurality of curling iron members, and a hair shaving unit. Examples of prior art structures may be found in U.S. Pat. No. 4,743,735 to Abura, et al. utilizing a portable battery powered hair curler formed with a recharging unit and rechargeable batteries.

U.S. Pat. No. 4,354,093 to Zago includes a support stand for supporting a plurality of curling irons thereon, wherein the curling irons are plugged into the stand, and wherein the stand utilizes a thermostat to regulate heated temperature of the associated curling irons.

U.S. Pat. No. 4,803,341 to Varowski, et al. sets forth a heatable curling iron magnetically secured within a support rack.

U.S. Pat. No. 4,659,907 to Andis, et al. provides a wall-mounted device mounting a hair dryer thereon for access by an individual.

U.S. Pat. No. 4,533,818 to Green sets forth an electric hair curler including a self-container battery supply for use by individuals.

As such, it may be appreciated that there continues to be a need for a new and improved cordless salon utensil organizer apparatus wherein the same addresses both the problems of ease of use, as well as effectiveness in construction and in this respect, the present invention substantially fulfills this need.

SUMMARY OF THE INVENTION

In view of the foregoing disadvantages inherent in the known types of hair salon utensils now present in the prior art, the present invention provides a cordless salon utensil organizer apparatus wherein the same provides aligned securement and positioning of various salon utensils for convenience of access and recharging of the utensils during periods of non-use. As such, the general purpose of the present invention, which will be described subsequently in greater detail, is to provide a new and improved cordless salon utensil organizer apparatus which has all the advantages of the prior art hair salon utensil devices and none of the disadvantages.

To attain this, the present invention provides an apparatus including a housing, wherein the housing defines a top wall formed with a series of aligned bores therethrough, each of the bores receiving a rechargeable hair salon utensil therewithin. A recharging plug is provided within each bore for providing recharging of each utensil. Optionally, the organization includes replacement battery packs selectively mounted to each utensil to ensure contonous use of each utensil. Further, a mirror structure is mounted rearwardly of a forward wall of the housing and nested therewithin and selectively retracted therefrom, wherein the mirror is heated by proximity to the recharging cells of the organization minimizing fogging of the mirror in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cordless salon utensil organizer apparatus which has all the advantages of the prior art hair salon utensil devices and none of the disadvantages.

It is another object of the present invention to provide a new and improved cordless salon utensil organizer apparatus which may be easily and efficiently manufactured and marketed.

It is a further object of the present invention to provide a new and improved cordless salon utensil organizer apparatus which is of a durable and reliable construction.

An even further object of the present invention is to provide a new and improved cordless salon utensil organizer apparatus which is susceptible of a low cost of manufacture with regard to both materials and labor, and which accordingly is then susceptible of low prices of sale to the consuming public, thereby making such cordless salon utensil organizer apparatus economically available to the buying public.

Still yet another object of the present invention is to provide a new and improved cordless salon utensil organizer apparatus which provides in the apparatuses and methods of the prior art some of the advantages thereof, while simultaneously overcoming some of the disadvantages normally associated therewith.

Still another object of the present invention is to provide a new and improved cordless salon utensil organizer apparatus wherein the same provides ease of access and positioning of various salon utensils for convenience in use and access by individuals.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view, partially in section, of a prior art salon utensil.

FIG. 2 is an isometric illustration of a further prior art salon utensil device.

FIG. 3 is an isometric illustration of the instant invention.

FIG. 4 is an isometric illustration of the instant invention utilizing replacement battery packs for use by utensils of the instant invention.

FIG. 6 is an isometric illustration of a further modified housing of the instant invention.

DESCRIPTION OF THE PREFERRED EMBODIMENT

Figure 5:
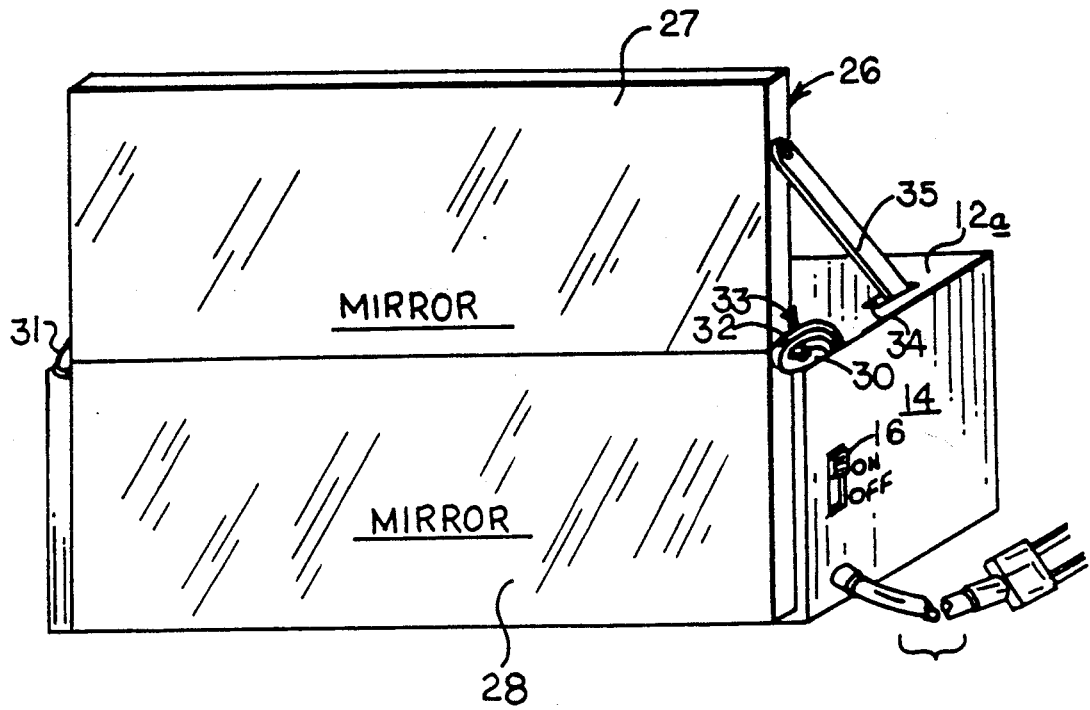
FIG. 5 is an isometric illustration of a modified housing utilized by the instant invention.

With reference now to the drawings, and in particular to FIGS. 1 to 7 thereof, a new and improved cordless salon utensil organizer apparatus embodying the principles and concepts of the present invention and generally designated by the reference numeral 10 will be described.

FIG. 1 illustrates a prior art salon utensil 1, wherein a curling iron 3 is mounted overlying a heating assembly 4, with a magnetic portion mounted within the housing of the apparatus to attract a ferro magnetic portion of the curling iron. FIG. 2 illustrates a further prior art salon utensil device 5, wherein a housing 6 supports a plurality of spaced curling irons 7 and the curling irons include a cord 9 mounted into the housing 6, wherein the housing 6 includes a separate cord 8 to direct energy into the housing for thermostatic control of electrical power directed to the curling irons.

More specifically, the cordless salon utensil organizer apparatus 10 of the instant invention essentially comprises an elongate housing 11 including a top wall 12 overlying spaced side walls, including a right side wall 14 and a rear and forward wall, including a forward wall 13. An electrical power cord 15 in cooperation with an on/off switch 16 is directed through the right side wall 14 to direct electrical current selectively to each of a plurality of aligned recharge plug units 36 (see FIG. 7) positioned and directed through the floor of each of an aligned series of socket bores 23 formed through the top wall 12 of the housing 11. The recharge plug units 36 include prong members 36a to be received within a socket receptable 22 formed within a lowermost surface of replaceable and rechargeable battery packs 21 defined by a predetermined diameter mounted within each of a series of appliances to be received within each of the bores 23. The appliances include a first salon appliance 17 defined as a hair dryer, with a second salon appliance 18 defined as a larger diameter curling iron, a third salon appliance 19 defined as a small diameter curling iron, and a fourth salon appliance 20 defined as an electric razor. The appliances are typically utilized individually during a grooming procedure by individuals, and are accordingly mounted in a convenient and accessible manner within the housing 11.

FIG. 4 illustrates the use of a modified housing 11a, wherein the modified forward wall 13a includes a plural pair of aligned "U" shaped arcuate spring clip legs 24 mounted in pairs defining a socket to receive a replacement battery pack 25 within each of the four pairs of "U" shaped arcuate spring clip legs 24. The replacement battery packs 25 include a plug boss 25a, as do the battery packs 21 to be received within each of the appliances 17-20 to ensure continuous operation and use of the appliances.

Figure 7:
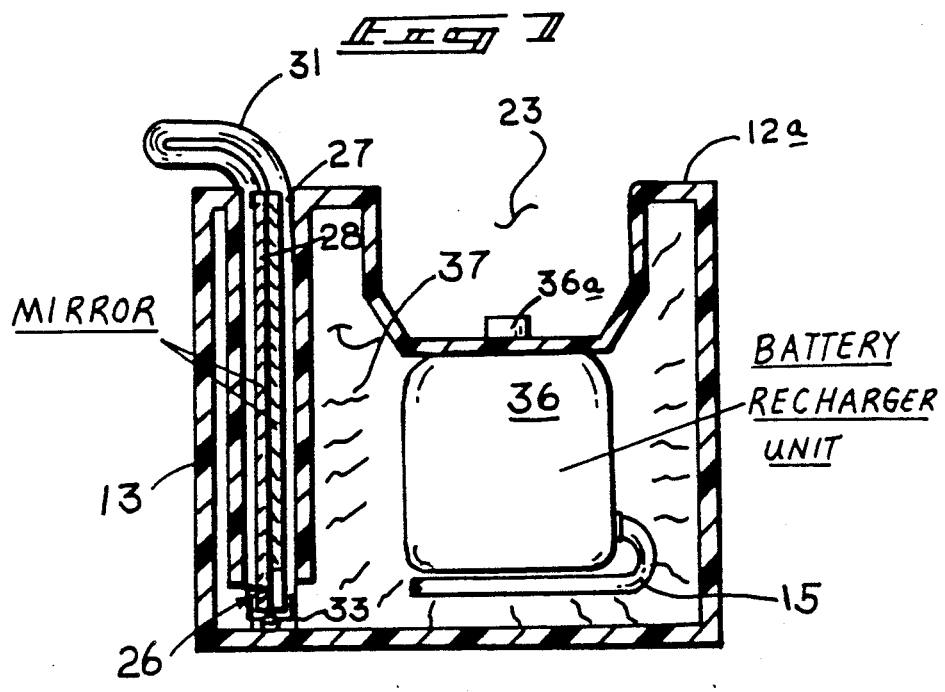
FIG. 7 is an orthographic view, taken along the lines 7—7 of FIG. 6, in the direction indicated by the arrows.

FIGS. 5-7 illustrate a further modified housing, wherein a modified top wall 12a includes an elongate slot 38 arranged parallel to the forward wall 13 and substantially coextensive with the modified top wall 12. The ends of the slot 38 have mounted thereto and extending above and beyond the slot 38, a right slotted track 30 and a left slotted track 31. The right and left slotted tracks include the uppermost portion thereof extending to position to align the slot within each of the tracks to an orientation positioned overlying the forward wall 13. A hinged mirror 26 includes a top mirror panel 27 pivotally mounted to a bottom mirror panel 28, including a hinge 33 mounted on each side of the junction of the top and bottom mirror panels and includes an axle 32 extending orthogonally relative to side edges of the mirror panels and received within each of the arcuate slotted tracks 30 and 31. As the mirror folds medially along the joinder of the top and bottom mirror panels, it is received within the slot 38 in a stored orientation, as illustrated in FIG. 6. A pull string 29 is mounted to one of the top edges of the mirror panels to permit extraction of the mirror panels for erection in an assembled orientation, as illustrated in FIG. 5, wherein the top and bottom mirror panels are in a single plane aligned relative to one another in the erected position, and interfolded in a face-to-face relationship, as illustrated in FIG. 6 when in a stored position. It should be understood, as illustrated in FIG. 7, that the slotted tracks 33 when extended to the floor of the housing, guide each axle 32 extending from each hinge from the retracted position to the extended position, as illustrated. The mirror 26 is heated when contained within the housing 11 by the various battery recharge plug units 36, and this heating of the mirror minimizes fogging in use when the mirror is in the extended and erected configuration, as illustrated in FIG. 5. A support leg 35 is pivotally mounted at one end to the top mirror panel 27 and is typically contained within the slot 38, wherein in its remote lower end is positionable within a recess 34 positioned adjacent the right side wall 14 through the top wall 12a to support the mirror 26 in the erected configuration.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cordless salon utensil organizer apparatus comprising, in combination,
   a housing, the housing including a top wall, spaced side walls including a right side wall, spaced forward and rear walls, including a forward wall overlying a floor of the housing, and
   a series of socket bores directed through the top wall of the housing, and each bore including a recharge plug unit mounted at a lowermost end of each bore within each recharge plug unit, including a plurality of prong members, the battery recharge units in electrical communication with a power cord, the power cord directed exteriorly of the housing and including an on/off switch to selectively direct electrical power to the battery recharge units, and
   a rechargeable appliance mounted within each of the bores, and
   wherein the bores includes a first, second, third, and fourth bore in an aligned relationship directed through the top wall of the housing, and each appliance including a replaceable rechargeable battery pack mounted at a lowermost terminal end of each appliance replaceably thereto, wherein each battery pack includes a socket receptacle arranged for electrical communication with the battery recharge plug unit of each bore, and
   wherein each appliance includes a first appliance defined as a hair dryer directed through a first socket bore, a second salon appliance defined as a large diameter curling iron directed through the second socket bore, a third salon appliance defines as a small diameter curling iron directed through a third socket bore, and a fourth salon appliance defined as an electric razor directed and receivable with a fourth socket bore of the bores directed through the top wall of the housing, and
   including an elongate slot directed through the top wall of the housing, the elongate slot substantially coextensive with the top wall of the housing adjacent the forward wall, and a mirror means mounted within the slot and positioned wholly within the slot in a first position and removable from the slot in a second position.

2. An apparatus as set forth in claim 1 wherein the mirror means includes a top mirror panel and bottom mirror panel, the top and bottom mirror panels including a hinge mounted to each top and bottom mirror panel to pivotally join the top and bottom mirror panels together, wherein the top and bottom mirror panels define a single forward plane in the second position, and wherein the top and bottom mirror panels are in a face-to-face inter-folded relationship in the second position.

3. An apparatus as set forth in claim 2 including a right and left arcuate slotted track mounted at respective right and left terminal ends of the slots, each arcuate track including a slot extending overlying the top wall and aligned with the forward wall.

4. An apparatus as set forth in claim 3 wherein the top and bottom mirror panels include a right and left axle extending exteriorly of the mirror means, each right and left axle receivable within each respective right and left slotted arcuate track.

5. An apparatus as set forth in claim 4 including a support leg, the support leg pivotally mounted to the top mirror panel at a top end portion of the support leg, and the bottom end portion support leg secured within the top wall, and the top wall including a recess, the recess aligned with the socket bores to receive the bottom portion of the support leg therewithin.

* * * * *